July 17, 1956 — B. COOPER ET AL — 2,755,023
SENSING DEVICE
Filed May 23, 1952 — 4 Sheets-Sheet 1

INVENTORS
BENJAMIN COOPER
ALBERT F. HOHMANN
BY
J.B. Felshin
ATTORNEY

INVENTORS
BENJAMIN COOPER
ALBERT F. HOHMANN

ATTORNEY

INVENTORS
BENJAMIN COOPER
ALBERT F. HOHMANN
BY
J. B. Felshin
ATTORNEY

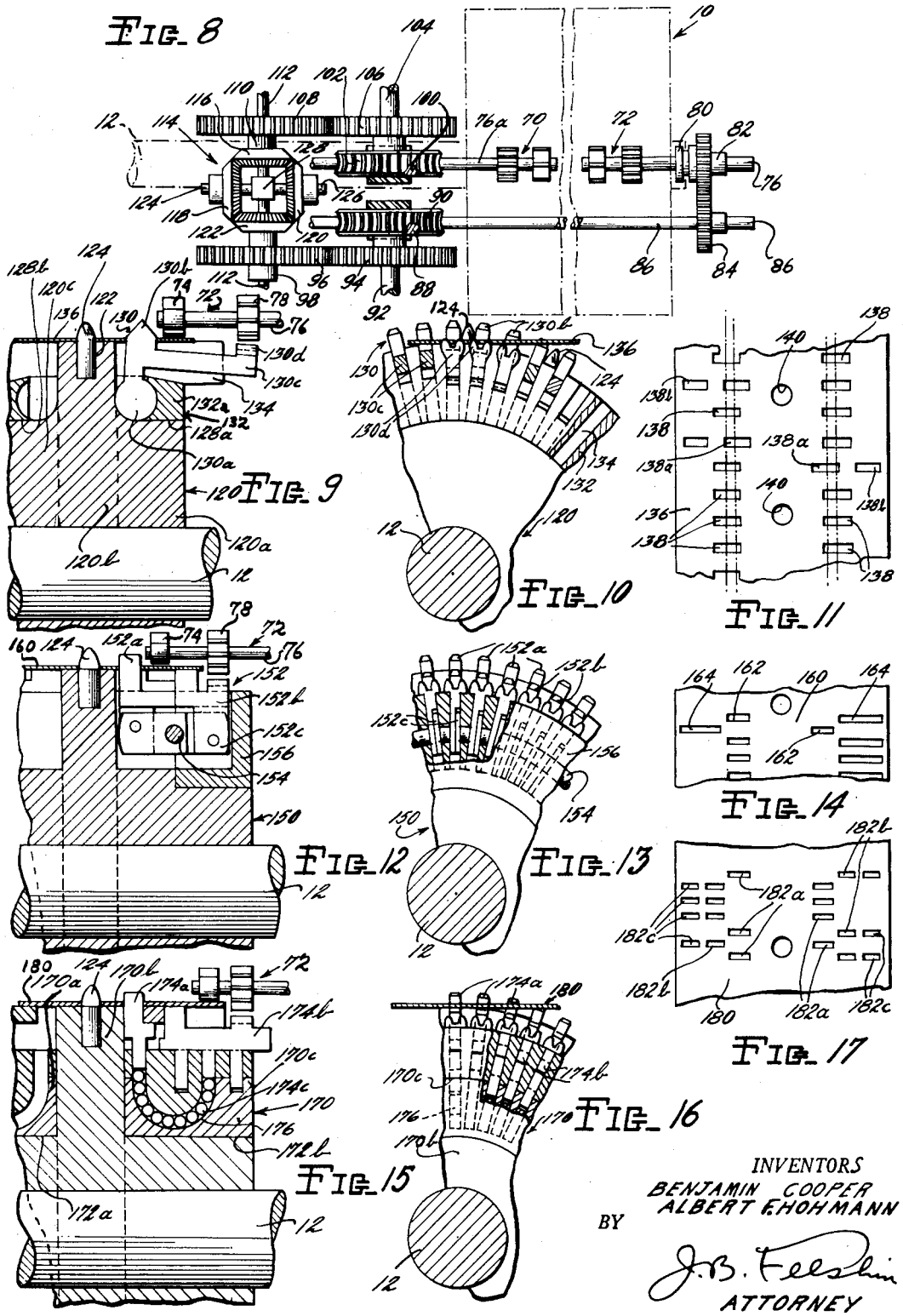

United States Patent Office 2,755,023
Patented July 17, 1956

2,755,023

SENSING DEVICE

Benjamin Cooper, New York, N. Y., and Albert F. Hohmann, Teaneck, N. J.; said Hohmann assignor to said Cooper Application May 23, 1952, Serial No. 289,641

8 Claims. (Cl. 235—61.11)

This invention relates generally to tape sensing devices and in particular to a rotatable device having sensing means actuatable by data-carrying tapes.

The present invention comprises a rotatable drum-like member journalled in a suitable frame and a co-acting tape adapted to tangentially engage a portion of the drum periphery and move therewith as said drum rotates. Radially extending from the drum periphery is a concentric row of feed pins adapted for successive engagement with complemental feed apertures perforated in the tape. The drum and tape are driven by a common source to effect synchronous movement therebetween.

The drum-like sensing device integrally carries sensing means that are actuated directly by the tape, i. e., the sensing means are actuated by engagement with the tape and accordingly, sense information carried by said tape, as will be hereinafter described in detail. Conventional tape sensing devices normally operate in such manner, whereby data in the form of perforations will permit sensing means to be moved or actuated by extraneous means. The present invention utilizes the tape to directly actuate the sensing means. This relationship permits an extremely high sensing rate of increments of information per second in said tape since the sensing means are entirely enclosed within and carried by the drum-like structure.

The tape is preferably composed of a metallic material such as thin spring steel having inherent rigidity sufficient to actuate the sensing means upon engagement therewith and yet have sufficient resiliency to permit the storage of said tape on reels or the like.

In addition to the feed holes perforated in the tape, there are polarized perforations which in accordance with their location relative to the feed holes, represent a positive value, a negative value or a zero value. The positive or negative values are represented by the absence of normally present, discriminately disposed, perforations or may be represented by the relative position of the perforations of the feed apertures in said tape. In the preferred embodiment of the invention, the normally present perforations are disposed for alignment with the sensing means carried by the drum and when engaged therein, said sensing means are not actuated. Thus, the absence of a perforation relative to the presence of another perforation will actuate one sensing means and convey information thereby.

The sensing means carried by the drum-like device are coupled with means that are, in turn, engageable with a read-out mechanism that integrates the sensed polarized values and directionally rotates an output shaft in accordance therewith.

Therefore, one of the principal objects of the invention resides in the provision of a tape having codal information thereon in the form of solid patterns defined by discriminate perforations and a rotary sensing device for sensing the data in said tape.

Another object is to provide a rotary tape sensing device having sensing means that are actuated directly by a tape during the sensing thereof.

Still another object of the invention is to provide a rotary tape-sensing device having integral sensing means.

And still another object is to provide a rotary tape-sensing device having sensing means that are continuously actuatable while a tape travels tangentially therepast with a continuous non-intermittent movement.

A further object is to provide means for reading out the sensed data in said drum operable to translate the sensed data into directive and angular shaft rotation.

Another object is to provide means for restoring actuated sensing means to pre-sensed condition after the data has been read out.

Other ancillary objects will be, in part, hereinafter apparent and in part hereinafter pointed out.

In the drawings:

Figure 8 is a plan view of the readout means including the differential mechanism, illustrating the rotary device in block form;

Figure 9 is a fragmentary cross-section of another embodiment of the invention illustrating a combined sensing finger and gear slide in non-actuated condition;

Figure 10 is a fragmentary end elevation of the embodiment shown in Figure 9;

Figure 11 is a plan view of a tape utilized in combination with the embodiment shown in Figures 9 and 10, and illustrates the controlling relationship of the perforations therein;

Figure 12 is a fragmentary cross-section of a further embodiment of the invention illustrating a sensing means and gear slide means in non-actuated condition;

Figure 13 is an elevation of the embodiment shown in Figure 12;

Figure 14 is a plan elevation of the tape utilized with the embodiment shown in Figures 12 and 13;

Figure 15 is a fragmentary cross-section of still another embodiment of the invention illustrating a sensing means and gear slide means in non-actuated condition;

Figure 16 is an end elevation of the embodiment shown in Figure 15; and

Figure 17 is a plan elevation of the tape utilized with the embodiment illustrated in Figures 15 and 16.

Figure 1:
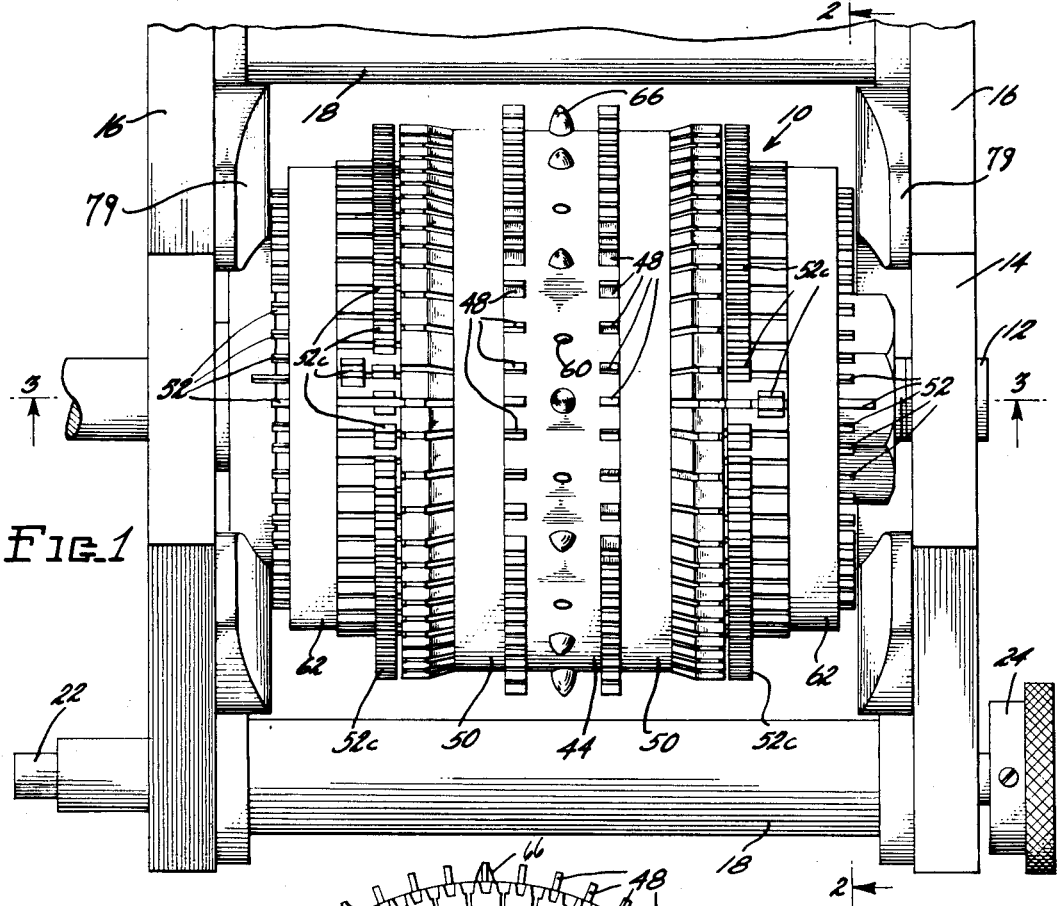
Figure 1 is a plan view of the rotary tape-sensing device with tape and readout means omitted for clarity and illustrating a positive and a negative slide in actuated condition.

Referring to Figs. 1 to 7, of the drawings in detail, 10 generally designates a rotatable drum 10 mounted on a shaft 12 journalled in bearings 14. Side walls 16 support said bearings in suitable apertures provided therein. Interposed between side walls 16 are a pair of spacer shafts 18 which secure said walls in rigid parallel relation. Each of the spacer shafts 18 is provided with an axial bore 20, one of which receives a spring loaded latch rod 22. Rod 22 is provided with a knob 24 at one end, to facilitate manual operation thereof.

Rod 22 is provided to permit pivotal mounting of drum unit 10 relative to the tape feed, not shown. This feature forms no part of the present invention.

Drum unit 10 generally comprises plural sections 26, 28 and 30. Sections 26 and 30 are similar in structure, but are, however, diametrically opposite in relationship. Sections 26, 28 and 30 are each provided with a co-aligning co-axial bore 32 adapted to receive shaft 12 therein.

Shaft 12 has secured thereon, an annular flange 34 spaced longitudinally from threaded shaft end portion 35. Sections 26, 28 and 30 are assembled on shaft 12 with the outer side of section 26 abutting against flange 34. The outer side of section 30 is engaged by nut 38 on threaded shaft portion 35 which effectively secures sections 26, 28 and 30 in assembled relation. Co-aligning, co-axial bores 40 in each of the sections receive pins 42 therein to prevent relative rotation between adjacent sections.

Section 28 is provided with a peripheral rim flange 44 that oppositely extends to overlie portions of the adjacent sections 26—30. Rim flange 44 is diametrically reduced to form annular steps 44a and 44b at its opposite peripheral edges. Milled in flange 44 are pluralities of transverse, equally spaced, arcuate slots 46 which communicate with the outer periphery of section 28 and the respective sides thereof. Each slot 46 is arranged to receive an arcuate finger 48 having corresponding radii that permit said finger to arcuately move therein. A retaining ring 50 of angular cross-section is pressed on and overlies each of the flange steps 44a and 44b thus retaining fingers 48 in slidable relation in their respective slots 46. Each finger 48 has formed at its lower terminal a radially extending projection 48a that is adapted to engage a retaining ring 50 and thus limit upward sliding movement thereof in slot 46. With projections 48a abutting against ring 50, the other end of fingers 48 extends beyond the periphery of drum section 28.

The lower terminal of each finger 48 is arcuately formed to provide a bearing surface that abuts against a respective transversely slidable gear slide 52. Therefore, depression of a finger 48 by tape 54, in a manner hereinafter described in detail, moves gear slide 52 from a normally ineffective position to an effective position as is particularly well shown in Fig. 6.

Gear slides 52, of which there are two pluralities, are disposed in equally spaced relation in linear slots 56 milled in the periphery of sections 26 and 30, respectively. Each slot 56 extends through and communicates with the respective sides of each of the respective sections 26 and 30. The slotted periphery of each section 26—28, is graduated in steps of differing diametrical dimensions, 26a—30a, 26b—30b, 26c—30c and 26d—30d.

Gear slides 52 generally comprise a narrow-width rectangular base portion 52a, a vertical portion 52b upwardly extending from base 52a, a gear block 52c having two teeth formed thereon, a tip portion 52d and a horizontally projecting guide portion 52e. The height of base portion 52a is substantially equal to the depth of slot 56 measured from the periphery of step 26a or 30a and step 26d or 30d. Accordingly, the pressed fit of retaining rings 62 on steps 26a and 30a effectively retains the pluralities of gear slides in slots 56 while permitting lateral sliding movement thereof.

Gear slide block portion 52c is of substantially rectangular block formation with a pair of teeth formed therein and projecting upwardly. Said teeth are spaced one from the other whereby tip portion 52d of the gear slide is disposed in alignment with the space therebetween. Base portion 52a of each gear slide 52 is substantially longer than the length of a slot 56 and, accordingly, when positioned therein, extends beyond the outer edges of said slot. The purpose of the extending base portion will be hereinafter apparent.

Referring to Figs. 3, 4, 5, and 6, the inner end of each slide base portion 52a resides under rim flange 44 of section 28. Said slide inner ends are further disposed in spaced relation from the side of the radial center portion of unit section 28 by means of horizontally projecting guide slide portion 52e. Said projection 52e is adapted to engage the vertical side of a retaining ring 50 and thus limit the inward movement of the gear slide. The space between the radial center portion of section 28 and the inner terminals of gear slides 52 communicates with a plurality of transverse bores 58 that extend through section 28. Communicating with each transverse bore 58 is a plurality of radial bores 60 which provide air vents that relieve pneumatic pressure produced by gear slide movement. The opposite or outer end of base portion 52a of each gear slide resides under the respective retaining rings 62 which limit the outward travel of the respective gear slides by means of vertical portion 52b thereof abutting thereagainst.

Figure 4:
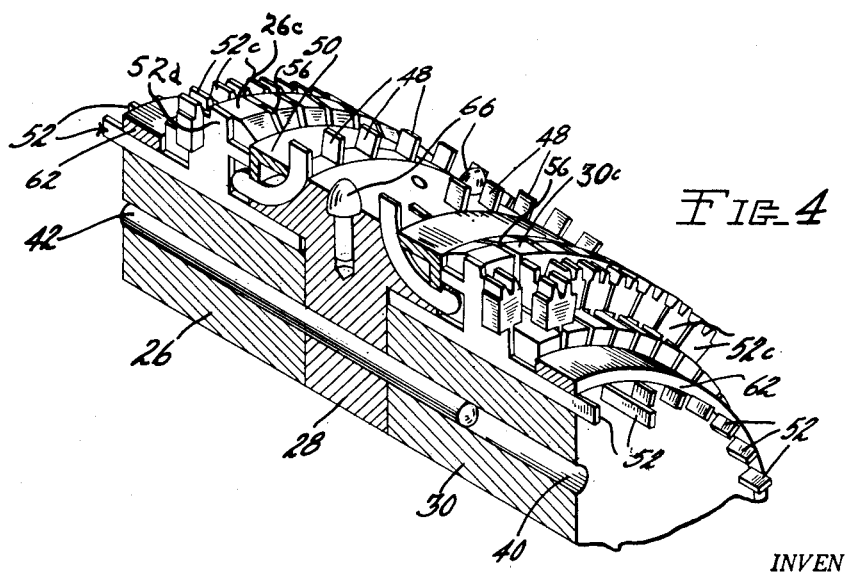
Figure 4 is a fragmentary isometric projection of a portion of the rotary device illustrating in cross-section, the sensing means with one sensing finger in depressed condition and its associated gear slide in actuated condition.
Figure 6:
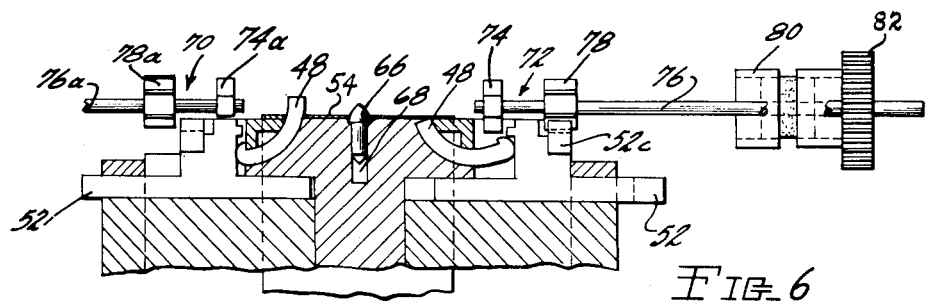
Figure 6 is a fragmentary view taken in cross-section of the rotary device and readout means showing one sensing finger in non-actuated condition extending through a perforation in a tape and the other sensing finger in actuated condition along with its associated gear slide.

As is particularly well shown in Fig. 4, the uppermost edge of tip portion 52d on each gear slide 52 normally resides in the portion of slot 56 formed between segments of steps 26c or 30c of the respective drum sections 26 and 30. Thus, when disposed in the aforesaid normal position, the tip portions of the gear slides provide a relatively smooth uninterrupted periphery on said steps. The reason for this condition will be hereinafter apparent.

Figure 2:
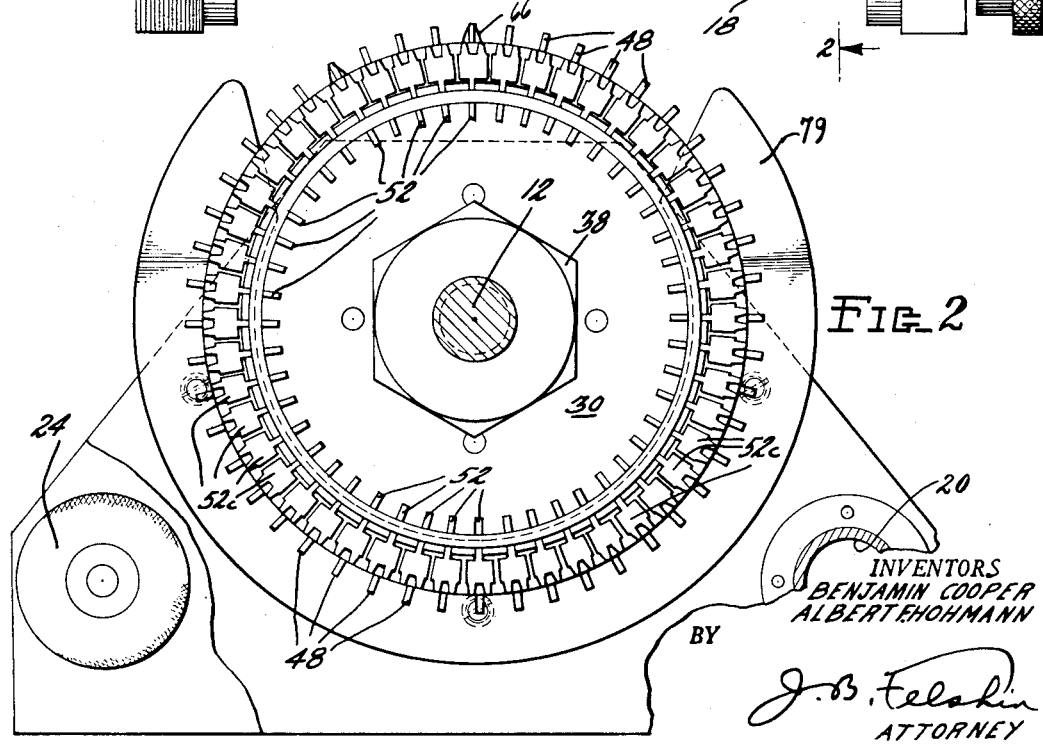
Figure 2 is an end elevation taken along line 2—2 of Figure 1 illustrating the concentric relationship of the various elements of the rotary device.
Figure 3:
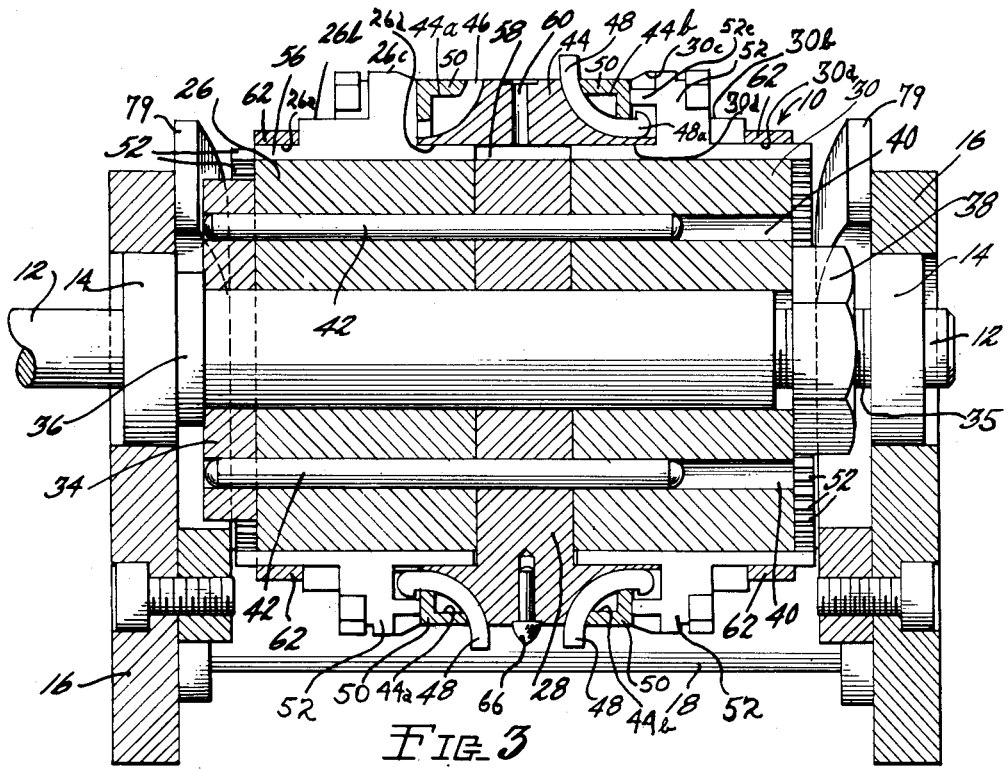
Figure 3 is a cross section taken through a rotary device along line 3—3 of Figure 1 with one sensing finger and associated gear slide omitted to more fully illustrate the supporting structure therefor.

Further, it will be noted from Figs. 2 and 4 that the gear forming portions 52c of each gear slide, when disposed in normal position, provide a continuous row of teeth, the purpose of which will also be hereinafter apparent.

Figure 7:
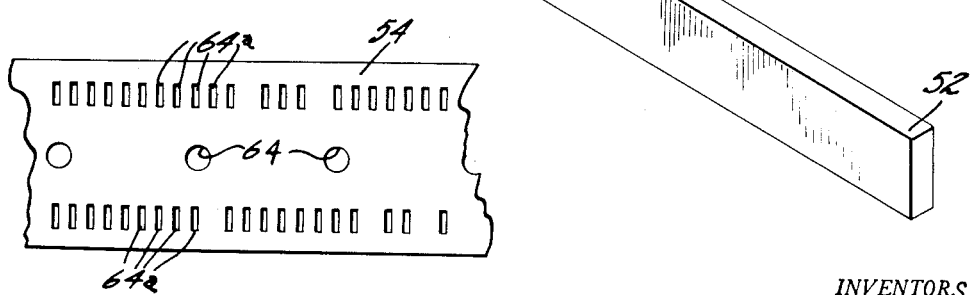
Figure 7 is a plan view of the tape utilized with the preferred embodiment of the invention shown in Figures 1 through 6.

Referring to Fig. 7, there is shown a fragment of tape 54. Said tape has perforated therein a centrally disposed row of feed apertures 64. Disposed laterally of feed perforations 64 are discriminately perforated rectangular apertures 64a. Said apertures are the means for determining whether or not, fingers 48 are to be actuated or not actuated, as the case may be during the sensing of said tape. When tape 54 is disposed on the periphery of drum section 28, such as shown in cross-section in Fig. 6, feed pins 66 secured in apertures 68 of said section engage apertures 64 in tape 54 and accordingly, guide the tangential movement and accurate disposition of said tape relative to fingers 48.

The present device is designed solely to read out polarized information carried by a tape. Accordingly, the gear slides 52 positioned on the left of the rotary device as viewed in Fig. 6, may be designated as the negative value gear slides. The gear slides 52 disposed on the right hand portion of the rotary device, as viewed in Fig. 6, conversely designate the positive value gear slides. Thus, when a perforation 64a is provided in the left hand section of tape 54, or upper half as viewed in Fig. 7, the respective finger 48 will enter said perforation and therefore, will not be actuated or depressed. However, the absence of a perforation diametrically opposite in the right hand section will result in the tape 54 engaging the projection portion of the right hand or positive finger 48 and effect the depression of said finger. The depressed finger 48 engages and moves its associated positive gear slide 52 outwardly to the position shown in Fig. 54. As a result of the outward movement of the positive gear slide 52, the tip portion 52d thereof is moved rightwardly from the step 30c thereby interrupting the smooth nornally continuous periphery. Further, its gear block 52c is simultaneously moved rightwardly into an effective position as will be hereinafter described.

Figure 5:
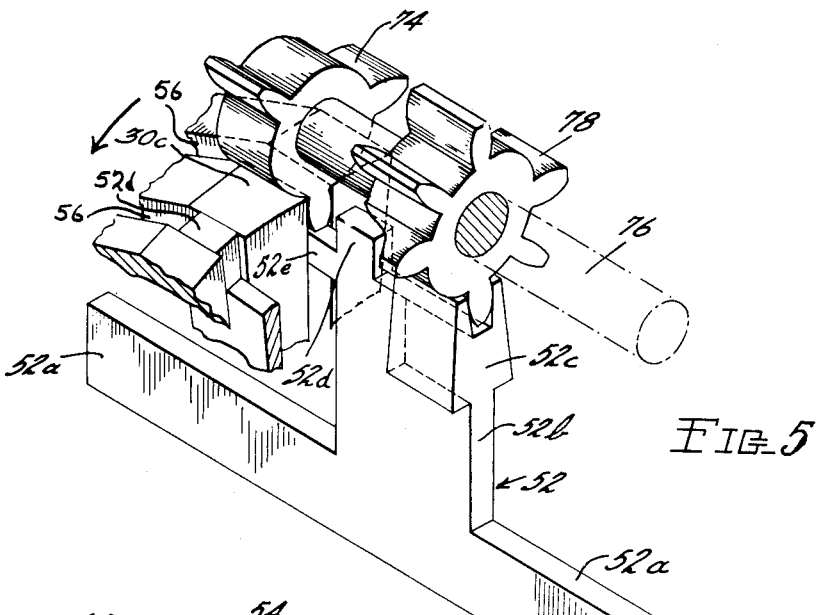
Figure 5 is a fragmentary isometric projection of a gear slide in actuated condition in engagement with the data readout means.

Means are provided to read out the sensed polarized information and directed toward this end are negative and positive readout means 70 and 72, respectively. As hereinbefore set forth, tape 54 tangentially moves continuously in peripheral engagement with a portion of the rotating drum unit 10. Thus, it will be understood that primary engagement of the tape with the normally extended sensing fingers effects a depression of those desired fingers prior to the mid section of travel of the arc of rotation during which the fingers are engageable with the tape. For example, the tape may be in engagement with the periphery of the rotating unit for approximately sixty degrees of its rotation. Therefore, the first thirty degrees of engagement effectively depresses the fingers selected in accordance with the information in the tape. Disposed midway of the sixty degree engagement are the readout means 70 and 72, respectively. The thirty degree period of finger depression assures complete actuation prior to the actuation of the readout means 70, 72. The readout means 70 and 72 are substantially similar in principle but are, however, diametrically opposite in structural relation. Readout means 72 comprises a three-tooth pinion 74 affixed to a shaft 76 journalled in suitable bearings, not shown. Spaced inwardly on shaft 76 from the three tooth pinion 74, is a six tooth pinion 78 also affixed to said shaft. As shown in Figure 5, the spacing between the shaft 76 and step 30c of drum section 30 is less than the radius of each tooth on pinion 74. Therefore, said pinion cannot rotate unless a tip portion 52d of a gear slide 52 is moved rightwardly and the space normally occupied thereby is vacant. With the elements so positioned, one of the teeth on pinion 74 is free to enter the slot 56 and rotate therepast.

The rightwardly disposed gear block 52c is positioned to engage the six tooth pinion 78. Thus passage of an extended gear slide 52 past the readout means 72 results in shaft 76 rotating one increment in a clockwise direction with the drum unit rotating in the direction of the arrow, Figure 5. It will be noted that the proximity of shaft 76 to the peripheral step 30c prevents undesirable vibratory rotation of said shaft since the locking pinion 74 can't rotate unless a gear slide has been actuated, and a space formed in step 30c. Further, it will be noted that gear forming blocks 52c normally reside between the pinions 74 and 78 and only when a gear slide is actuated, is the respective gear forming block disposed for engagement with the pinion 78. Readout means 70 operates in the identical manner hereinbefore described for readout means 72 and by means of intermediate gearing hereinafter described in detail, the effective rotation of readout means 70 is reversed.

Means are provided to restore actuated gear slides 52 to their actual position and to this end there is provided a pair of cams 79.

After the respective readout means has been actuated by a displaced or extended gear slide 52, continued rotation of rotary member 10 carries the extended gear slide into engagement with the related restoring cam 79. Cams 79 are of substantial horse-shoe shape and are disposed in diametrically opposite relation on the inner side of frame slide walls 16. The spacing between terminals of each cam 79 is approximately sixty degrees and congruous to the sixty degree sensing operation hereinbefore described. Therefore, gear slides 52 are free to extend under control of tape 54 during the sensing operation and are positively restored to their initial position and held restored during the remaining three hundred degree rotation of rotary member 10.

Referring to Fig. 8, shaft 76 of readout means 72 is connected through a shock-absorber 80 to a gear 82 journalled on shaft 76. Gear 82 is disposed in engagement with a gear 84 affixed to a shaft 86 disposed parallel relative to shaft 76. Shaft 86 has secured thereto a worm 88 meshing with a worm wheel 90 affixed to a transverse shaft 92. Shaft 92 has further secured thereto a gear 94 meshing with a gear 96 affixed to a sleeve 98.

Shaft 76a of readout means 70 similarly has affixed thereto a worm 100 disposed in meshing engagement with a worm wheel 102 secured to shaft 104. The latter shaft is coaxially aligned with shaft 92 and has secured thereon, a gear 106 that meshes with a gear 108 affixed to a sleeve 110. Sleeves 98 and 110 are coaxially aligned and passing therethrough is an output shaft 112. The various shafts hereinbefore mentioned are not shown mounted in bearings or the like, since such mountings are conventional and are well-known to those skilled in the art.

Output shaft 112 is part of a differential mechanism 114 that comprises a plurality of inter-meshing bevelled gears 116, 118, 120, and 122. Bevelled gear 116 is affixed to sleeve 110 and angularly meshing therewith are bevelled gears 118 and 120 respectively. Bevelled gears 122 affixed to sleeve 98, analogously meshes with the respective bevelled gears 118 and 120 in diametrically opposite relation to the aforesaid gear 116.

Bevelled gears 118 and 120 are journalled on coaxial stub shafts 124 and 126 respectively. Interconnecting the inner ends of stub shafts 124 and 126 is a block 128 which is provided with a transverse bore that receives output shaft 112 therein. Block 128 is secured to shaft 112 by conventional means, not shown, and rotates therewith.

Thus it may be said that output shaft 112 will rotate in angular increments corresponding to the angular rotation of readout means 70 and 72 with the direction of output shaft rotation being determined by the actuation of the respective readout means.

Output shaft 112 may be connected to an indicator, selsyn motor or some other element that requires control. However, such an element is not shown and forms no part of the present invention.

Referring to Figs. 9, 10 and 11, there is shown another embodiment of the invention wherein a rotary member 120 is affixed to a revoluble shaft 12a. Member 120 comprising assembled sections 120a, 120b and 120c operates in the same manner as unit 10 hereinbefore described, except for the cooperating tape and sensing means.

Perforated in the periphery of member 120 are a plurality of spaced apertures 122 in which feed pins 124 are secured. The outer marginal edges of sections 120a and 120c of member 120 are recessed in diametrically opposite relation to provide steps 128a and 128b, respectively. Disposed peripherally around steps 128a and 128b are pluralities of pivotal sensing fingers 130 each formed with a substantially circular base portion 130a, an upstanding finger portion 130b and a transversely extending portion 130c. Formed on the outer terminal of portion 130c is a radially projecting gear segment 130d. Each member 130 is disposed in adjacent relation on the respective steps 128a and 128b and retained thereon by T-shaped retaining rings 132. The inner surface of base portion 132a of rings 132 is of arcuate formation to conform to the finger base portion 130a. The horizontal portions of rings 132 are slotted to provide plural spaced transverse slots 134 in which finger portions 130b and 130c reside. Thus fingers 130 are freely pivotal through a limited arc defined by the wall of section 120b and the concentric portion of rings 132.

Tape 136 is movable tangentially across the periphery of rotary member 120 as said member rotates to control respective sensing fingers 130. As shown in Fig. 11, tape 136 is provided with a row of spaced apertures 138 on each side of the feed apertures 140. Apertures 140 are adapted to engage feed pins 124 in the same manner hereinbefore described for the preferred embodiment of the invention.

In an analogous manner, apertures 138 control the ineffective positions of fingers 130, i. e. apertures 138 are so disposed to engage the projecting ends of fingers 130 to cam said ends clockwise such as is illustrated in Fig. 9. In this position, readout means 72 cannot rotate. It may be noted that in the present instance, the locking pinion does not ride on the periphery of the rotary member but rides directly on tape 136. Therefore, when finger 130 engages an offset aperture 138a, and is pivoted counterclockwise, Fig. 9, gear segment 130c is moved upwardly into position for engagement with pinion 78. At the same time, the leading tooth of locking pinion 74 is allowed to enter an aperture 138b that is disposed laterally in alignment with the aperture 138a. Thus, it will be seen that in the embodiment shown in Figs. 9, 10, and 11, tape 136 controls both the actuation and de-actuation of the sensing fingers 130.

Another embodiment of the invention is illustrated in Figs. 12, 13 and 14 wherein a rotary member 150 is provided of similar relationship to the embodiments hereinbefore described wherein the sensing fingers are controlled directly by the tape in actuation and de-actuation. Sensing fingers 152 comprise three elements; a reciprocal finger 152a, a reciprocal gear segment 152b, and an interconnecting lever, 152c. Suitable pin and slot connections, not shown, interconnect finger 152a with lever 152c and gear segment 152b with lever 152c. Levers 152c are pivotal around a retaining ring 154. A retaining ring 156 of angular cross section secures the respective fingers, levers and gear segments on the rotary member 150. Tape 160 is utilized with rotary member 150 in the same manner as hereinbefore described. Apertures 162 are adapted to receive fingers 152a therein when it is not desired that the fingers be actuated. When it is desired to actuate the fingers 152a, the space normally occupied by aperture 162 is not perforated and that portion of the tape engages and depresses said finger. However, an aperture 164 of substantially greater length than aperture 162 is provided in a laterally offset manner from the rows of apertures 162. As shown in Fig. 14, wherever an aperture 162 is provided, an aperture 164 is not provided. Aperture 164 performs a dual function of permitting the leading tooth of locking pinion 74 of readout means 72 to enter therein and permits gear segment 152b to rise. It will be noted that gear segment 152b is provided with a raised projection that limits the upward movement thereof when engaged by tape 160. It is apparent that the raised portion of gear segment 152b will enter aperture 164 when a finger 152a is depressed. Thus, locking pinion 74 and pinion 78 of readout means 72 may rotate one increment.

Accordingly, the embodiment shown in Figs. 12, 13 and 14 also controls the actuation and de-actuation of the sensing fingers directly by a tape that is being sensed.

A further embodiment is illustrated in Figs. 15, 16 and 17, wherein rotatable member 170 cooperatively senses a tape 180 and is controlled thereby.

Rotary member 170 comprises three adjacent sections 170a, 170b and 170c. Central section 170b is provided with a pair of diametrically opposite steps 172a and 172b in which the sensing means are disposed. The annular steps 172a and 172b are adapted to receive the concentric sections 170a and 170c respectively in which sensing fingers 174a are disposed for reciprocal movement. Likewise, gear segments 174b associated therewith are disposed for reciprocal movement. In this embodiment of the invention, fingers 174a and segments 174b are interconnected by means of a plurality of ball bearings 174c disposed in an arcuate bore 176 which communicates with the lower extremities of finger 174a and segment 174b. Thus, it is readily apparent that depression of a finger 174a applies pressure on ball bearings 174c and transmits an upward motion to segment 174b. Similarly, depression of the projecting portion of segment 174b results in the upward movement of a finger 174a.

Tape 180 therefore controls the actuation of the respective fingers. Tape 180 has perforated therein apertures 182a, 182b and 182c. Apertures 182a permit fingers 174a to enter therein while the solid portion of the tape in alignment therewith engages one of the extending gear segment projections 174b to depress said gear segment. In the event that aperture 182a is omitted in order to depress a finger 174a, apertures 182b and 182c are provided in adjacent relation. Aperture 182b permits the projection on a gear segment 174b to rise beyond the periphery of the rotating member, thus permitting the gear segment to be positioned for engagement with pinion 78 of readout means 72.

Adjacent aperture 182c provides means whereby locking pinion 74 may rotate with pinion 78.

It will thus be seen that there is provided a device in which the several objects of the invention are achieved and which is well adapted to meet the conditions of practical use.

As various embodiments might be made of the above inventions and as various changes might be made in the embodiments set forth, it is to be understood that all matters herein set forth or shown in the accompanying drawings are to be interpreted as illustrative and not in a limiting sense.

The invention claimed is:

1. A device of the class described, comprising a rotatable member, a plurality of depressable means normally extending radially from the periphery of said rotatable member, means carried by said rotatable member actuatable by said depressable members from an initial position to a second position upon said depressable members being depressed, a second rotatable member and means for rotating said second rotatable member upon said actuatable member being actuated.

2. A device of the class described, comprising a rotatable member, pluralities of radially extending depressable fingers carried by said rotatable member, said pluralities of fingers being equi-angularly disposed in concentric relation around the periphery of said rotatable member, a second rotatable member and a third rotatable member, said second rotatable member being adapted to be controlled by one of said pluralities of radially extended fingers and said third rotatable member being adapted to be controlled by the other of said plurality of radially extending fingers, means to rotate said second and third rotatable members controlled by said pluralities of depressable fingers, and said pluralities of depressable fingers being adapted to be depressed in a predetermined relationship wherein said second and third rotatable members rotate in a corresponding relationship.

3. In combination, a rotary member, sensing means thereon, comprising pluralities of radially extending fingers, said fingers being adapted to be depressed from normally extended position to a depressed position by indiscriminate interruptions in a perforated tape, intermediate means actuatable by the actuated sensing means, read out means actuated by the actuated intermediate means, and means to restore the actuated sensing means and the actuated intermediate means to pre-sensed condition.

4. In combination, a drum, means to rotate said drum, sensing means on said drum adapted to be directly actuated by discriminate interruptions in a perforated tape, read out means associated with said drum, said sensing means being provided with means to actuate said read out means upon actuation of said sensing means by the interruptions, and means normally preventing actuation of said read out means.

5. In combination, a rotatable drum, sensing means on said drum adapted to be actuated by discriminate interruptions in a perforated tape, intermediate means actuatable by the actuated sensing means, read out means associated with said drum, means normally preventing actuation of said read out means, said intermediate means being arranged to release the means normally preventing actuation of said read out whereby said read out means is free to be actuated, and said intermediate means being adapted to actuate said read out means upon actuation of said sensing means.

6. In combination, a rotary member, pluralities of sensing means carried by said rotary member, adapted to be independently actuated by discriminate interruptions in perforated control means, plural read out means, each being co-operable with their respective plurality of sensing means and operable by individual actuated sensing means in each of said pluralities of sensing means, means normally locking said read out means against actuation and means co-operable with said sensing means to release said locking means whereby said read out means is actuated by the actuated sensing means.

7. In combination, a drum having a row of radial feed pins, pluralities of radial sensing fingers disposed in concentric alignment around the periphery of said drum, each of said pluralities of sensing fingers being disposed in opposite spaced relation from the row of radial feed pins, a slide associated with each sensing finger actuatable from a normal position to a second position upon actuation of the related finger, said sensing fingers being adapted to be actuated by discriminate interruptions in a perforated control means, and read out means actuatable by said actuated slides.

8. In combination, a drum having a row of radial feed pins, pluralities of radial sensing fingers disposed in concentric alignment around the periphery of said drum, each of said pluralities of sensing fingers being disposed in opposite spaced relation from the row of radial feed pins, a slide associated with each sensing finger actuatable from a normal position to a second position upon actuation of the related fingers, said sensing fingers being adapted to be actuated by discriminate interruptions in a perforated control means, read out means actuated by said actuated slides, and means to restore the actuated slides and related sensing fingers to normal position after said read out means is actuated.

References Cited in the file of this patent
UNITED STATES PATENTS

| | | |
|---|---|---|
| 1,432,345 | Lasker | Oct. 17, 1922 |
| 1,745,388 | Tauschek | Feb. 4, 1930 |
| 2,454,628 | Braun | Nov. 25, 1948 |